United States Patent [19]
Bittner

[11] Patent Number: 4,806,842
[45] Date of Patent: Feb. 21, 1989

[54] SOFT START FOR FIVE PIN SWITCHING REGULATORS

[75] Inventor: Harry J. Bittner, Santa Clara, Calif.

[73] Assignee: National Semiconductor Corporation, Santa Clara, Calif.

[21] Appl. No.: 191,463

[22] Filed: May 9, 1988

[51] Int. Cl.[4] .......................................... H02M 3/155
[52] U.S. Cl. .................................... 323/222; 323/285; 323/288; 323/901; 363/49
[58] Field of Search .................. 363/49; 323/222, 284, 323/288, 901; 307/265

[56] References Cited

U.S. PATENT DOCUMENTS 3,959,714  5/1976  Mihelich .............................. 323/901
4,598,351  7/1986  Fair et al. .............................. 363/49

FOREIGN PATENT DOCUMENTS 144567  6/1987  Japan .

OTHER PUBLICATIONS

"Switching Regulator Soft-Start Circuit," IBM Tech. Discl. Bul., vol. 29, No. 5, pp. 2019, 20, Oct. 1986.
"Focus on Power Supply IC's" Electronic Design, pp. 137-141, Aug. 8, 1985.

Primary Examiner—William H. Beha, Jr.
Attorney, Agent, or Firm—Gail W. Woodward; Lee Patch; Mark Aaker

[57] ABSTRACT

A soft start circuit for a switching regulator is disclosed. The circuit does not require any off-chip parts and, therefore, a five-pin package can be employed. The operation of a soft start circuit in conjunction with a switching regulator operating in the voltage boost mode is set forth in detail.

5 Claims, 2 Drawing Sheets

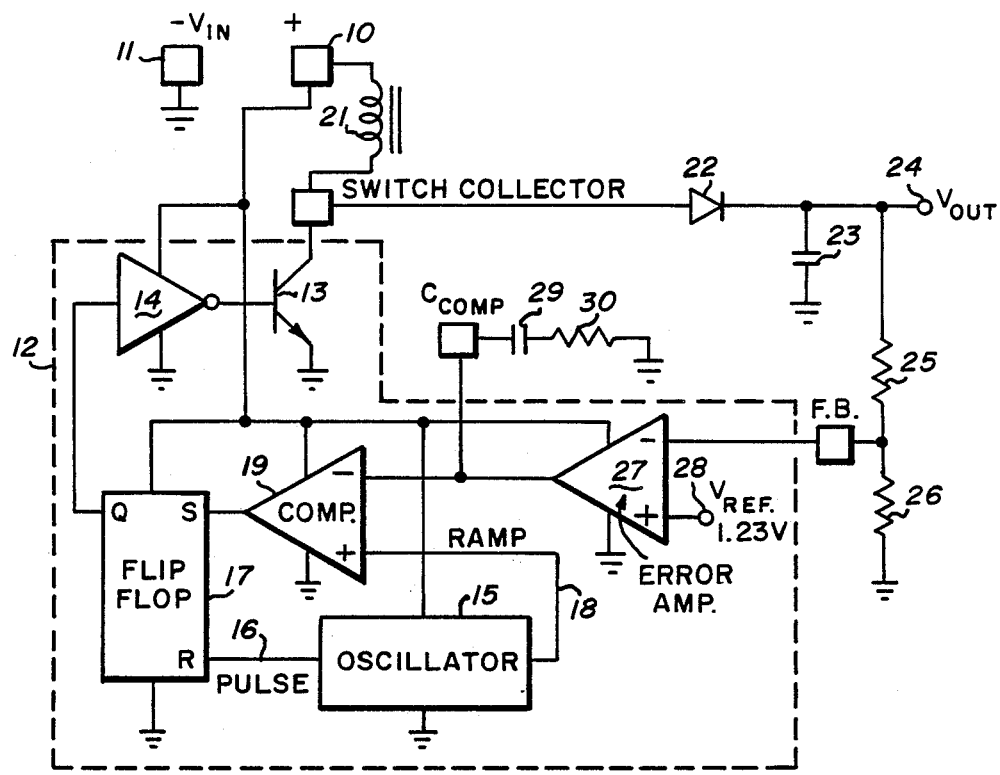
Fig_1 (PRIOR ART)
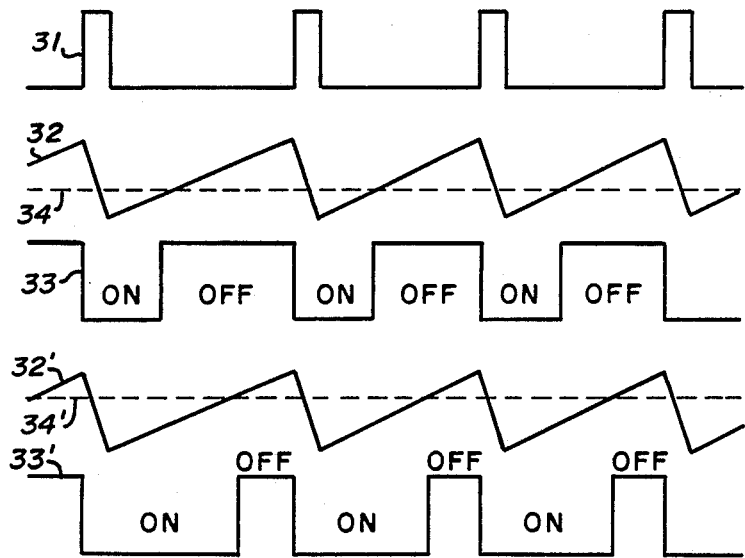
Fig_2 (PRIOR ART)

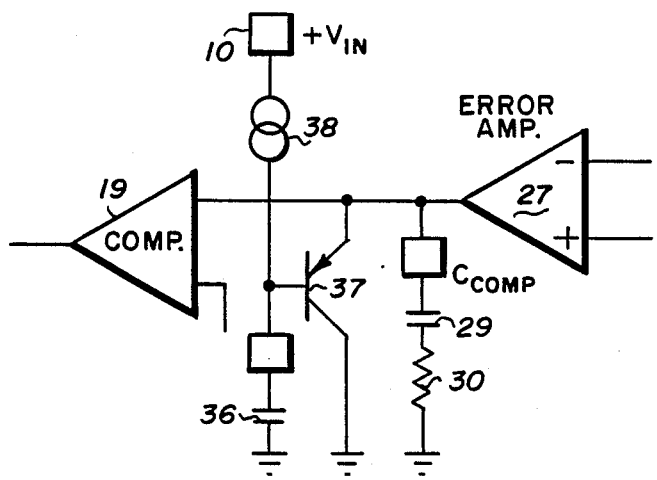
*Fig_3* (PRIOR ART)
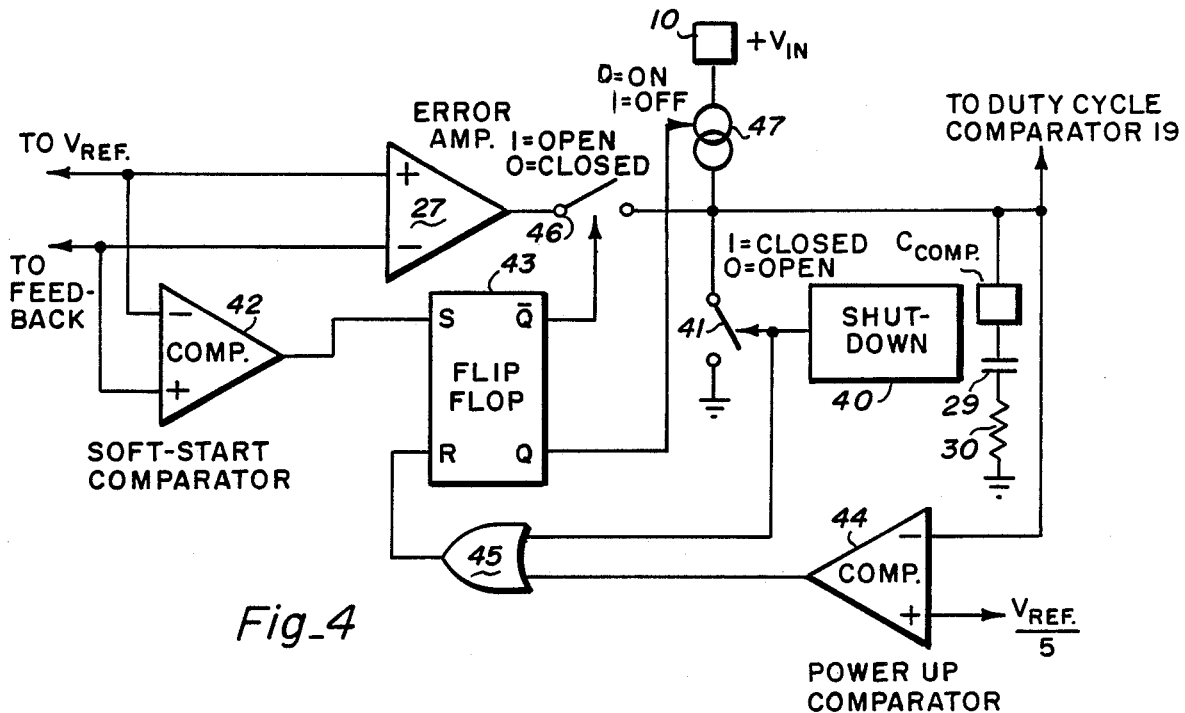
*Fig_4*

SOFT START FOR FIVE PIN SWITCHING REGULATORS

BACKGROUND OF THE INVENTION

The industry recognized TO-220 power transistor package is well known for its relatively high power dissipation and has become very popular as a standard power device package. It originally appeared in a three pin configuration used for power transistors. Such power transistors were rated at up to 60 watts dissipation for $T_C=25°$ C. Later a five pin version became popular for integrated circuit devices.

The five pin TO-220 package is almost ideal for housing voltage regulators of the switching variety. The device contains a high current switch along with an oscillator and pulse width modulator that can operate the switch and vary its duty cycle as a function of a feedback or control voltage input. When this device is combined with a relatively few eternal parts it can provide a regulated d-c voltage output. For example, it can provide an up-converter or boost function in which the regulated output exceeds the input supply voltage. It can further be employed in buck converter mode where the output voltage is substantially lower than the output and as positive-to-negative or negative-to-positive polarity converters. Finally, it can be used in conjunction with a transformer which not only isolates the output, but can be employed to provide relatively large regulated output voltages. In terms of power supply efficiency switching regulators can operate at about 90% or better.

FIG. 1 illustrates the prior art boost switching regulator in the form of a combined block-schematic diagram. An input voltage $V_{IN}$ is applied between + terminal 10 and ground terminal 11. The IC chip elements are shown within dashed outline 12 and the chip pads are diagrammed as squares.

The heart of the circuit is a power switching transistor 13 which is operated by driver amplifier 14. An oscillator 15, operating in the vicinity of 10–100 kHz, controls the switching rate of the circuit and provides two outputs. A narrow pulse output on line 16 applies a reset pulse to flip flop 17 the Q output of which is applied to driver 14. An oscillator ramp output on line 18 is fed to the noninverting input of duty cycle comparator 19, the output of which is coupled to the set input of flip flop 17. Elements 15, 17 and 19 form a pulse width modulator which will control the duty cycle of switch 13 as a function of the d-c potential at the inverting input of duty cycle comparator 19.

An inductor 21 couples the collector of switch transistor 13 to the power supply at terminal 10. Rectifier 22 in conjunction with capacitor 23 peak rectifies the potential produced at the collector of switch transistor 13 and a filtered d-c output is available at terminal 24. In view of the relatively high frequency of oscillator 15, a modulator value capacitor 14 provides excellent filtering. In a boost type of circuit the d-c voltage at terminal 24 is higher than the power supply voltage at terminal 10.

Resistors 25 and 26 divide the output voltage by a controlled ratio and apply it to the inverting input of error amplifier 27. A reference potential, $V_{REF}$, is applied to the noninverting input at terminal 28. This reference potential is provided by a well-known band gap circuit (not shown) which produces a temperature stable 1.23 volts. The output of error amplifier 27 is coupled to the inverting input of comparator 19. This completes the voltage regulator feedback loop. A compensation capacitor 29 and resistor 30 bypass the output of error amplifier 27 so that the feedback loop has the gain and phase margin needed for stability.

In operation the switching duty cycle will be varied until the voltage across resistor 26 equals $V_{REF}$ at terminal 28. Thus, the stable operating condition produces a $V_{OUT}$ of:

$$V_{OUT} = 1.23\left(1 + \frac{R_{25}}{R_{26}}\right)$$

where $R_{25}$ and $R_{26}$ are the values of resistors 25 and 26.

The value of inductor 21 is chosen so that the inductor current changes a fraction of its average D.C. value when it is charged and discharged. When switch 13 is on the inductor current will rise linerly with time. Then, when switch 13 turns off the inductive kick back will pull the potential at the collector of switch 13 up until diode 22 conducts to charge capacitor 23 which develops the d-c output. Thus, the positive excursion of the collector of switch 13 is clamped at one diode drop above $V_{OUT}$ and the negative excursion is clamped at $V_{SAT}$.

The circuit of FIG. 1 will maintain a constant d-c output over a wide range of d-c supply voltage inputs. For example, when a d-c output of 15 volts is employed the ratio between resistors 25 and 26 will be about 11.2:1. Good output regulation will be maintaind over the input range of 3 to 12 volts in the boost mode.

FIG. 2 is a graph showing the circuit waveforms. Waveform 31 represents the reset pulses on line 16. Waveform 32 is ramp signal on line 18. Dashed line 34 represents the output of the error amplifier 27 which is a d-c potential due to the action of capacitor 29. Waveform 33 is the signal at the collector of transistor 13. The on transition of waveform 33 is initiated by the reset pulse of waveform 31 and terminated by comparator 19 when the ramp intersects line 34. For the condition shown it can be seen that the on duty cycle is relatively short. This is due to the fact that $V_{OUT}$ is close to $V_{IN}$ and not much energy is required to charge capacitor 23. This is called a low gain condition.

When the circuit is operated at high gain, where $V_{IN}$ is a fraction of $V_{OUT}$, the condition of waveform 33' develops. Here dashed line 34' is high on the curve of waveform 32' and waveform 33' shows that the duty cycle has increased. This will be required because a lower value of $V_{IN}$, will involve more energy being applied to the rectifier circuit to maintain the value of $V_{OUT}$. Thus, as the value of $V_{IN}$ varies waveform 34 will ride up and down on waveform 32 as needed to maintain the regulated $V_{OUT}$.

In terms of load regulation, when a varying load causes $V_{OUT}$ to vary, the same percentage change appears across resistor 26 and the input to error amplifier 37 will also vary. Thus, the duty cycle of the signal applied to transistor 13 will be varied whenever the output voltage is changed, in such a direction to restore the value of $V_{OUT}$ to its set point. Thus, the output voltage is fully regulated against changes in either load or input conditions. Typically, the regulation is to within about 0.1% or better.

The circuit of FIG. 1 portrays five IC pads. These are: $+V_{IN}$, ground, feedback, compensation capacitor and switch collector as indicated. It is clear that such a voltage regulator is well-suited to the five pin TO-220 package. It is also applicable to the industry standard four lead TO-3 in which the metal case is the ground terminal. However, any circuit embellishments that require additional package pins must be avoided.

While the above description applies to a boost type regulator, it is to be understood that the circuit can be used in other modes. For example, it can be used in the flyback, buck and polarity inverting modes. Furthermore, it can be used in conjunction with a transformer for isolation or relatively high voltage outputs.

One basic flaw in the above-described regulator is found in the starting. When the circuit is first started up capacitor 23 will be fully discharged and $V_{OUT}$ will be zero. Thus, when power is first applied $V_{REF}$ will dominate the error amplifier 27 and it will rapidly charge cpacitor 29. As shown in FIG. 2 this will maximize the waveform 33' duty cycle and the circuit will attempt to charge capacitor 23 as rapidly as possible. The resulting surge can damage output transistor 13 and may overload the input supply. Accordingly, some form of "soft start" is desirable where the starting surge is avoided.

FIG. 3 shows a typical prior art solution to the soft-start approach. A capacitor 36, transistor 37 and current source 38 have been added to the circuit. During circuit power up capacitor 29 will be initially discharged. When power up is to occur current source 38 will slowly charge capacitor 36, which is chosen to determine the charge time constant. The emitter of transistor 37 will clamp the output of error amplifier 27 to one diode drop above the charge on capacitor 36. Since this charge starts at zero and then rises slowly, comparator 19 does not immediately force the switch duty cycle to maximum. As a result, the circuit start is slow and is regarded as soft. However, as can be seen, this approach requires a second external capacitor and an extra chip bonding pad.

SUMMARY OF THE INVENTION

It is an object of the invention to provide a soft start operation in a switching regulator wherein no additional package pins are required.

It is a further object of the invention to force a switching regulator to a low duy cycle or state when the output voltage is low using a circuit that requires no additional package pins.

It is a still further object of the invention to force a switching regulator to a low duty cycle or state when the output voltage is low or when the circuit is being powered up.

These and other objects are achieved in the following manner. A soft start comparator, logic and switches are added to the prior art circuit. The soft start comparator senses when the inverting input of the error amplifier is below $V_{REF}$ and, by way of an R-S flip flop, acts to open a switch connected in series with the output of the error amplifier. Thus, for this condition the compensation capacitor will not be charged by the error amplifier output and the regulator duty cycle is at a minimum. The R-S flip flop for this condition also turns on a soft start current that will slowly charge the compensation capacitor and, thus, gradually increase the on portion of the switch duty cycle. This action slowly brings $V_{OUT}$ up to its operating level. As soon as the inverting input of error amplifier 27 is pulled up to $V_{REF}$ the soft start comparator will set the R-S flip flop and close the switch that connects the error amplifier to the compensation capacitor and normal regulator operation proceeds.

In addition to the above, the preferred embodiment of the invention includes a power up circuit. To accomplish this a power up comparator, coupled by way of logic to the R-S flip flop, is included. This comparator includes an 0.25 volt reference coupled to its noninverting input. Its inverting input is coupled to the compensation capacitor. Since this capacitor is fully discharged at power up, the power up comparator will reset the soft start action as described above. The soft start sequence will operate until the feedback level exceeds the $V_{REF}$ level.

The circuit further includes a shutdown feature that is activated by either an excessive chip temperature or a substandard output voltage. When shutdown is invoked a switch is closed so as to discharge the compensation capacitor and the R-S flip flop is reset by way of the circuit logic. Shutdown forces the duty cycle of the switching to minimum to relieve any chip overload. When the shutdown circuit recovers and signals the termination of shutdown, the capacitor shorting switch opens and the soft start action described above is initiated.

BRIEF DESCRIPTION OF THE DRAWING

FIG. 1 is a block diagram-schematic diagram of a conventional prior art switching regulator circuit.

FIG. 2 is a graph showing the operation of the FIG. 1 circuit for the conditions where the error amplifier output is low and high.

FIG. 3 is a block diagram-schematic diagram of a prior art soft start circuit.

FIG. 4 is a block diagram-schematic diagram of the circuit of the invention.

DESCRIPTION OF THE INVENTION

FIG. 4 shows a block diagram-schematic diagram combination of the circuits that make up the invention. These elements are added to those of FIG. 1. Where FIG. 1 elements are involved, the same designations are employed. A shutdown circuit 40 is employed to be responsive to undervoltage at terminal 10 or to excessive chip temperature. As a result of either of these two conditions, the output of shutdown 40 goes high and closes switch 41. This action discharges capacitor 29 and forces the duty cycle of the pulse width modulator to its minimum value. This effectively eliminates the thermal overload. If desired, the shutdown circuit can also be employed conventionally, by means not shown, to shut oscillator 15 off and thereby completely terminate circuit operation. Regardless of how it is done after shutdown, or in the event of power up, a soft start is desired.

To achieve soft start a soft start comparator 42 is coupled to R-S flip flop 43. The inverting input of soft start comparator 42 is coupled to $V_{REF}$ and the noninverting input is coupled to the feedback terminal which represents the voltage across resistor 26. A power up comparator 44 has its inverting input coupled to sense the charge on capacitor 29 and its noninverting input returned to a reference of about 0.25 volt. This can simply be about one-fifth of $V_{REF}$. Thus, when capacitor 29 has a charge that drops below 0.25 volt, the output of comparator 44 will go high and thereby indicate the onset of power up.

Thus, at the onset of a shutdown or a power up, OR gate 45 will reset R-S flip flop 43. In the reset state of R-S flip flop 43 $\overline{Q}$ output will be high. This will open switch 46 thereby disconnecting error amplifier 27 from duty cycle comparator 19 and capacitor 29. In the event of a shutdown signal switch 41 will have been closed thereby discharging capacitor 29 and reducing the switch duty cycle to minimum. Upon cessation of shutdown, switch 41 will open and the Q output of flip flop 43 being low will turn on current source 47. This current is established at a value that will slowly charge capacitor 29 in a soft start mode. The charge on capacitor 29 will slowly increase and thereby slowly increase the duty cycle of switch 13 until the voltage across resistor 26 exceeds $V_{REF}$. At this point, comparator 42 will set flip flop 43. This action turns off current source 47 and closes switch 46 which restores the circuit to normal voltage regulator action.

It can be seen that the soft start provided by the circuit of FIG. 4 does not require any off-chip parts and, therefore, does not invoke any extra package pins. All of the necessary soft-start functions are performed on the chip.

The invention has been described and its operation in a voltage boost switching regulator mode detailed. When a person skilled in the art reads the foregoing description, alternatives and equivalents, within the spirit and intent of the invention, will be apparent. For example, the application of the switching regulator to other operating modes will be evident. Accordingly, it is intended that the scope of the invention be limited only by the following claims.

I claim:

1. A switching regulator including a switch, means for driving said switch in a controlled duty cycle fashion in response to the output of a duty cycle comparator, an error amplifier driving said duty cycle comparator, a compensation capacitor and means for developing a reference potential against which said error amplifier operates, a soft start circuit comprising:

R-S flip flop means having set, reset and output terminals;

means for resetting said R-S flip flop when said compensation capacitor is discharged;

a soft start comparator having an output coupled to said set terminal of said flip flop, an inverting input coupled to said reference potential, a noninverting input coupled to said error amplifier input whereby said R-S flip flop is set when said error amplifier input exceeds said reference potential;

switch means coupled in series with the output of said error amplifier and responsive to said output to said R-S flip flop for disconnecting said error amplifier when said R-S flip flop is reset; and a current source coupled to charge said compensation capacitor at a controlled rate controlled by said output of said R-S flip flop to be one when said R-S flip flop is reset.

2. The switching regulator soft start circuit of claim 1 further including a shutdown circuit responsive to either excessive integrated circuit chip temperature or low power supply output voltage to reset said R-S flip flop, said shutdown circuit operating to close a switch connected across said compensation capacitor.

3. The switching regulator soft start circuit of claim 2 further including a power up comparator responsive to the charge on said compensation capacitor and operatively coupled to reset said R-S flip flop when said charge falls below a predetermined fraction of said reference voltage.

4. The switching regulator soft start circuit of claim 3 wherein said power up comparator output and said shutdown circuit are coupled to said reset terminal of said R-S flip flop by means of an OR gate.

5. The switching regulator soft start circuit of claim 1 wherein said switching regulator is in the form of an integrated circuit having a power input pad, a ground pad, a compensation capacitor pad, a switch terminal pad, and a feedback pad mounted in a five pin power package.

* * * * *